United States Patent [19]

Ban et al.

[11] 4,243,902

[45] Jan. 6, 1981

[54] DIRECT CURRENT MOTOR WITH NON-SUPERPOSED ARMATURE WINDINGS

[76] Inventors: Itsuki Ban, 829 Higashi-Oizumimachi, Nerima-ku, Tokyo; Manabu Shiraki, 4451-171 Shimotsuruma, Yamato-shi, Nerima-ku, Kanagawa-ken; Kazuhito Egami, 2-44-1 Chuo, Nakano-ku, Tokyo, all of Japan

[21] Appl. No.: 937,848

[22] Filed: Aug. 29, 1978

[30] Foreign Application Priority Data

Dec. 22, 1977 [JP] Japan .................. 52-153628

[51] Int. Cl.³ .......................................... H02K 23/54
[52] U.S. Cl. ...................... 310/154; 310/207; 310/268
[58] Field of Search .............. 310/268, 907, 198–202

[56] References Cited

U.S. PATENT DOCUMENTS

| Re. 25,305 | 12/1962 | Haydon | 310/268 |
| 302,319 | 7/1884 | Brush | 361/268 X |
| 3,686,521 | 8/1972 | Henry-Baudot | 310/96 |

*Primary Examiner*—Donovan F. Duggan
*Attorney, Agent, or Firm*—Kenway & Jenney

[57] ABSTRACT

A direct current motor is provided with a field magnet having 4 mn alternating N and S poles (m being a positive integer of one or more and n being a positive integer of two or more) that are magnetized within segments of equi-angular width about the field magnet, a magnetic-material member for closing the magnetic path of the field magnet, and a rotatably mounted armature having m(2n+1) armature windings equally distributed thereabout in a non-superposed manner with respect to each other and in a face-to-face relationship with respect to the field magnet poles, each winding having an angular spacing between those conductor portions thereof that contribute to the generation of the torque that is equal to the angular width of the field magnet poles.

2 Claims, 6 Drawing Figures

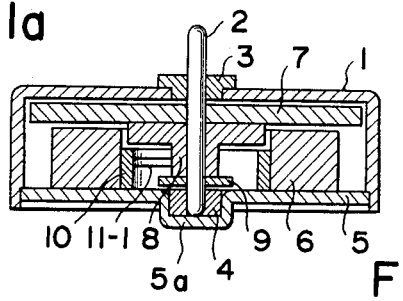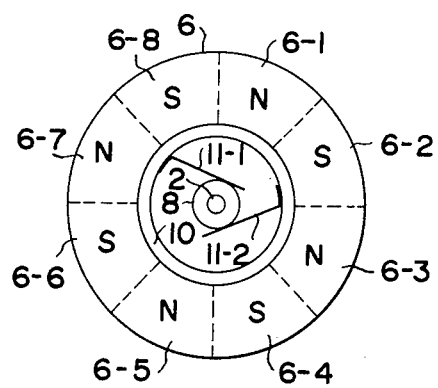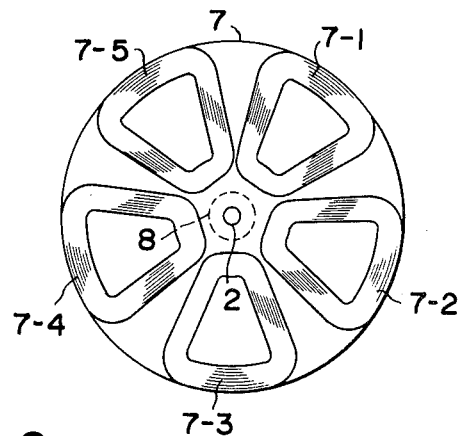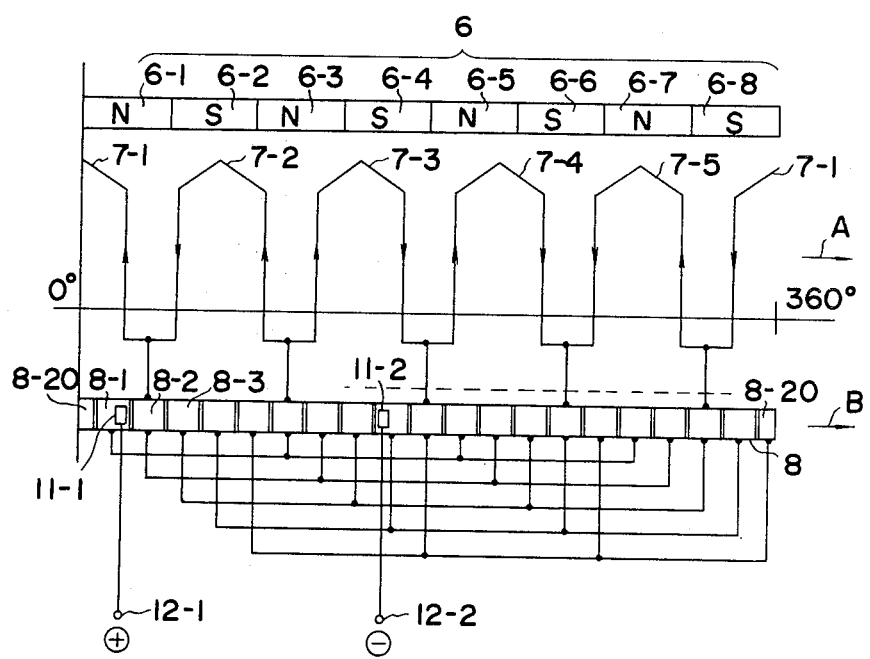

DIRECT CURRENT MOTOR WITH NON-SUPERPOSED ARMATURE WINDINGS

BACKGROUND OF THE INVENTION

This invention relates to a direct current (DC) motor which has, for 4n poles (n being a positive integer of 2 or more) of its field magnet, (2n+1) armature windings which are disposed on a disk-shaped or cylindrical armature in a nonsuperposed fashion with respect to each other or in a single layer.

In a conventional DC motor having a plurality of armature windings, the windings are generally disposed on the armature in such a manner that the windings are superposed on each other in multiple layers. In the manufacture of such DC motors, substantial labor is required for processing the edge portions of the superposed windings, this labor requirement impeding the convenient mass production of the motors. If a plurality of armature windings are resin molded and solidified into a unit for disposition on an armature, the resultant armature assembly will have an increased thickness because the armature windings are superposed on each other in multiple layers. This increased thickness of the armature will substantially reduce the effective magnetic field, which passes through the armature, of the field magnet, thus resulting in decreases in motor efficiency and starting torque.

SUMMARY OF THE INVENTION

The above-mentioned drawbacks in the prior art motor have been successfully eliminated by the present invention.

Accordingly, an object of the invention is to provide a DC motor which has a lower number of armature windings, is especially suited to mass production and is low in cost.

Another object of the invention is to provide a DC motor in which the effective length of these conductor portions of the armature windings that contribute to the generation of the torque is sufficiently large when compared with the length of those other portions, which contribute to the copper loss, that the efficiency of the motor is increased.

A DC motor according to the invention is provided with a field magnet having 4mn poles (m being a positive integer of 1 or more and n being a positive integer of 2 or more) which are magnetized alternately into N- and S-polarities in equal angular spaces, a magnetic material member for closing the magnetic path of the field magnet, m(2n+1) armature windings disposed on an armature each winding having an angular spacing between these conductor portions thereof which contribute to generation of the torque which is equal to the angular width of the field magnet pole, the armature windings equally distributed about the armature in a non-superposed manner with respect to each other and in a face-to-face relationship with respect to the field magnet poles, and a rotatable shaft for supporting either the armature or the field magnet for rotation the shaft supported by bearings provided in a motor housing.

These and other objects and features of the invention will become apparent from the following description of the preferred embodiments taken in conjunction with the accompanying drawings.

BRIEF DESCRIPTION OF THE DRAWINGS

FIG. 1a is a longitudinal cross-sectional view of a motor of the present invention;

FIG. 1b is a plan view of the field magnet poles in the motor of FIG. 1a;

FIG. 1c is a plan view of the armature in the motor of FIG. 1a;

FIGS. 2 and 3 are developed view of embodiments incorporating the field magnet poles shown in FIG. 1b and the armature windings shown in FIG. 1c having different interconnections.

DETAILED DESCRIPTION OF THE PREFERRED EMBODIMENTS

Figure 3:
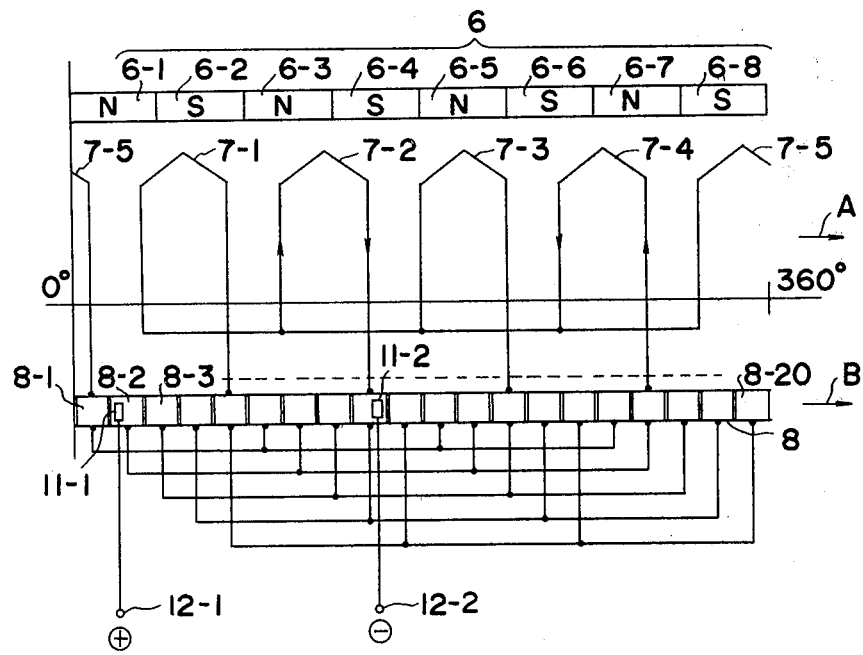

The specification describes an exemplary embodiment of a DC motor in accordance with the present invention which is provided with eight field magnet poles and five armature windings. FIGS. 1a, 1b and 1c illustrate the construction of a commutator motor which is provided with a disk-shaped armature. In FIG. 1a, the numeral 1 indicates a circular cup-shaped housing which is made by press forming a soft steel plate. A soft steel disk 5 is forced into the lower, open end portion of the housing 1 and secured therein to constitute the bottom plate of the housing. The disk 5 has a circular depression 5a formed in the central portion thereof. The housing 1 and the disk 5 are adapted to constitute and close the magnetic path in the motor. Bearings 3 and 4 are secured, respectively, to the housing 1 and the circular depression 5a and support a rotatable shaft 2 which has one end thereof pressed against and abutting the inner surface of the depression 5a. An annular field magnet 6 is secured to the inner surface of the disk 5. In armature 7 and an integrally molded commutator 8 are secured to the shaft 2. A washer 9 is fitted to the shaft 2, under the commutator 8, and functions as an oil shield. The armature 7 is placed within the magnetic field which appears between the housing 1 and the field magnet 6. The field magnet 6 consists of poles 6-1, 6-2, ... 6-8 which are of alternate N- and S-polarities, each subtending an angular space of 45°, as shown in FIG. 1b. A cylindrical plastic molded member 10 is fitted in the central opening of the annular field magnet 6 Brushes 11-1 and 11-2 are secured, at their base end portions, to the inner surface of the cylindrical member 10 and are in sliding contact, at their free end portions, with the commutator 8. FIG. 1c illustrates the construction of the armature 7 which includes sectorial armature windings 7-1, 7-2, 7-3, 7-4 and 7-5 embedded in a plastic disk at equal pitches, that is each within a 72° angular space. The angular spacing between those conductor portions of the sectorial armature windings that contribute to the generation of the torque, is 45° which is equal to the angular width of each of the field magnet poles 6-1, 6-2, ..., 6-8. With this configuration of the armature winding, the length of the outer and inner peripheries, which contribute to the copper loss, of the armature winding can be relatively short as compared with the radial length of the portions which contribute to the generation of the generate torque, thus being advantageously increasing efficiency. This configuration of the armature winding is especially desirable for increasing the efficiency of motors having disk-shaped rotors and for increasing the efficiency of motors in which such windings are applied to a cylindrical armature (not shown). Such armature windings can be conveniently formed by frame winding self-bonding wire. In the armature winding shown in FIG. 1c, the wire of each winding is wound turn by turn in alignment with a plane and not superposed on each other in multiple layers as in conventional lap winding, and, accordingly, the windings allow the fabrication of small thickness windings. Accordingly, distance between the field magnet 6 and the housing 1 (FIG. 1a) can be made small to obtain a stronger magnetic field resulting in increased efficiency and torque. In the armature 7 shown in FIG. 1c, five sectorial armature windings are juxtaposed with respect to each other in a plane and are embedded in the armature 7, and accordingly the armature is easy to manufacture and especially suited to mass production.

Referring now to the development of FIG. 2,

The principle of rotation is illustrated in the development view of FIG. 2 which shows the armature windings interconnected in a ring fashion. The commutator 8 comprises commutator segments 8-1, 8-2, ..., 8-20, each subtending an angular space of 18° (2/5 of the angular width of the field magnet pole). Respective sets of the commutator segments 8-1, 8-6, 8-11, 8-16, segments 8-2, 8-7, 8-12, 8-17; segments 8-3, 8-8, 8-13; 8-18; segments 8-4, 8-9, 8-14, 8-19; and segments 8-5, 8-10, 8-15, and 8-20 are each interconnected in common through respective lead wires. The numerals 11-1 and 11-2 indicate the brushes which are adapted to receive current respectively from positive and negative terminals 12-1 and 12-2 of a DC supply source. The angular spacing between the brushes 11-1 and 11-2 as shown in FIG. 2 is 135°, and any other value of the angular spacing of 45° (i.e., 360°/4mn, where m being a positive integer of 1 or more and n being a positive integer of 2 or more, and, in this case, m=1 and n=2), 225° or 315° will, in principle, be equivalent to the first mentioned value of 135°. In the state shown in FIG. 2, the current flows in the directions indicated by the arrows, i.e., there are a current flow which passes through the armature windings 7-2, 7-1, 7-5, and another current flow which passes through the armature windings 7-3, and 7-4. As a result of these current flows torque is generated at each armature winding to drive the armature 7 in the direction of arrow A and thereby causing the commutator 8 to rotate in the direction of the arrow B. Upon rotation of the armature 7 through 9°, the current will change to a flow passing through the windings 7-2 and 7-1, and another flow passing through the windings 7-3, 7-4, and 7-5, to generate driving torque at each winding. With an additional rotation of 9°, the current will be again changed to a flow passing through the windings 7.3, 7.2, and 7.1, and another flow passing through the windings 7.4 and 7.5, to generate driving torque at each winding. As is apparent, the torque which drives the armature, is generated in succession. In addition to the above-described feature, the motor of the present invention has additional features especially suited to a disk-type motor, such as high efficiency, a flat construction, little hysteresis loss, and little unevenness in torque.

FIG. 3 illustrates another example of a motor embodiment in accordance with the present invention wherein start or termination ends of the respective armature windings are interconnected in common. Similar numerals indicate like parts as in FIG. 2, and description thereof will be omitted. As shown in FIG. 3, start or termination ends of the respective armature windings are interconnected in common, and, in the state shown in FIG. 3, the other ends of the armature winding 7-1 is connected to the commutator segment 8-5, the other end of the winding 7-2 to the segment 8-9, the other end of the winding 7-3 to the segment 8-13, the other end of the winding 7-4 to the segment 8-17, and the other end of the winding 7-5 to the segment 8-1. Thus, in the state shown in FIG. 3, the current flows in the directions indicated by the arrows, i.e., no current flows through the armature windings 7-1, 7-3, 7-5, generating no torque, while current flows through the armature windings 7-4 and 7-2 to generate torque at these latter two windings, thereby to drive the armature 7 in the direction of arrow A, and accordingly cause the commutator 8 to rotate in the direction of arrow B. Upon 9° rotation of the armature, current will cease flowing through the windings 7-1, 7-3, 7-4, generating no torque, but will flow through the windings 7-5 and 7-2 to generate torque at these latter two windings. With a further 9° rotation, current will cease flowing through the windings 7-1, 7-2, and 7-4, generating no torque, but will flow through the windings 7-5 and 7-3 to generate torque at these latter two windings. As can be appreciated, torque is generated in succession to drive the armature.

Figure 4:
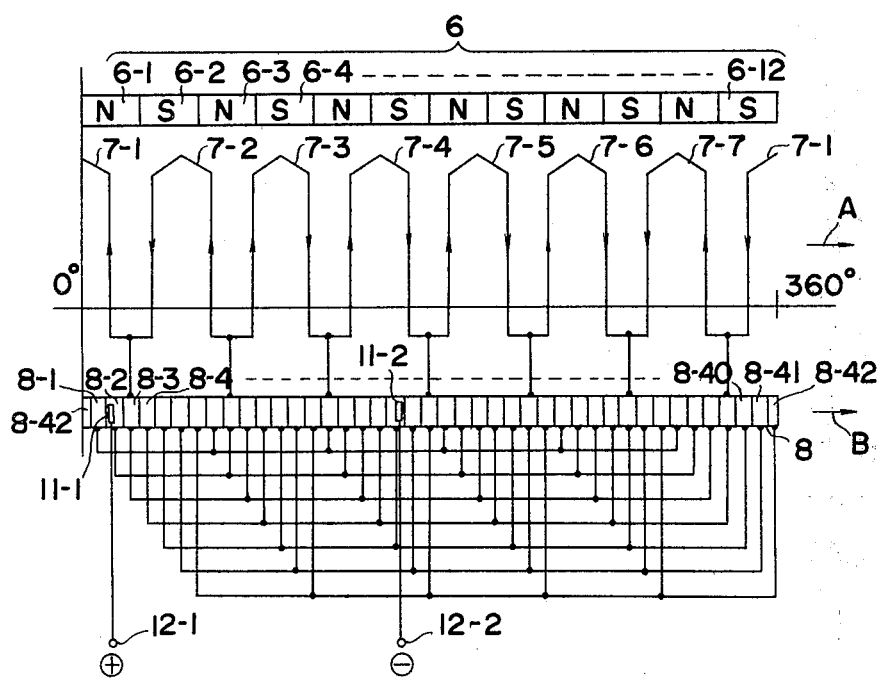
FIG. 4 is a developed view of another embodiment incorporating other field magnet poles and armature windings than those of FIGS. 1b, 1c, 2 and 3.

FIG. 4 shows the development of another embodiment which is provided with twelve field magnet poles and seven armature windings. In FIG. 4, the numerals 6-1, 6-2, ..., 6-12 indicate field magnet poles which are alternately of N and S polarity and subtend angular spaces of 30° and constitute a field magnet 6 which corresponds to the field magnet 6 in FIG. 1a. The numerals 7-1, 7-2, ..., 7-7 indicate armature windings which are disposed at equal pitches, i.e., at pitches or spacings of 360°/7 (about 51.4°), and are embedded in a disk of the armature which is similar to the armature disk 7 shown in FIG. 1a. The angular spacing between the conductor portions of the armature windings that contribute to the generation of torque; (which spacing is sectorial in shape) is 30° and is equal to the angular width of each of the field magnet poles 6-1, 6-2, ..., 6-12. A commutator 8 comprises commutator segments 8-1, 8-2, ..., 8-42, each subtending an angular space of 360°/42 (about 8.57°, and being 2/7 of the angular width of the field magnet pole). Respective sets of the commutator segments 8-1, 8-8, 8-15, 8-22, 8-29, 8-36; segments 8-2, 8-9, 8-16, 8-23, 8-30, 8-13; segments 8-3, 8-10, 8-17, 8-24, 8-31, 8-38; segments 8-4, 8-11, 8-18, 8-25, 8-32, 8-39; segments 8-5, 8-12, 8-19, 8-26, 8-33, 8-40; segments 8-6, 8-13, 8-20, 8-27, 8-34, 8-41; and segments 8-7, 8-14, 8-21, 8-28, 8-35, 8-42 are each interconnected in common through respective lead wires. The numerals 11-1 and 11-2 indicate brushes which are adapted to receive current respectively from positive and negative terminals 12-1 and 12-2 of a DC supply source. The angular spacing between the brushes 11-1 and 11-2 as shown in FIG. 4 is 150°, and any other value of the angular spacing of 30° (360°/4mn where m=1 and n=3), 90°, 210°, 270°, or 330° will be, in principle, equivalent to the first-mentioned value of 150°. The principle of rotation due to Fleming's law is similar as in the embodiment of FIG. 2, and a description thereof is omitted. The operation and corresponding effect of the embodiment of FIG. 4 are similar to those of the embodiment of FIG. 2. While, in FIG. 4, seven armature windings are interconnected in a ring fashion, start or termination ends of the respective windings may be interconnected in common.

While, in the above-described embodiments, disk-shaped armatures are employed, it is apparent that the invention can also be applied to a cylindrical armature. Further, the invention can also be realized in a commutator-less type motor in which current is supplied to armature windings by means of semiconductor devices. According to the invention, for 4n (n being a positive integer of 2 or more) field magnet poles, (2n+1) armature winding are employed, the angular space subtended by the armature winding being equal to the angular width of the field magnet pole. Thus, in the invention, other various combinations of the numbers of field magnet poles and the numbers of armature windings can also be employed, such as, a combination of four field magnet poles and three armature windings, a combination of sixteen field magnet poles and nine armature windings, etc. Further, in the invention, for 4mn field magnet poles (m being a positive integer of 1 or more), m(2n+1) armature windings (m being a positive integer of 1 or more) may be employed, the armature windings being disposed in a non-superposed fashion with respect to each other on the armature.

While the invention has been described in connection with the preferred embodiments, it is to be understood that various changes and modifications can be made without departing from the spirit and scope of the invention.

What is claimed is:

1. A direct current motor having armature windings that are non-superposed with respect to each other comprising:
    a field magnet having 4 mn poles that are magnetized into alternate N and S polarities in equal angular spaces wherein m is a positive integer of 1 or more and n is a positive integer of 2 or more;
    a magnetic-material member for closing the magnetic path of said field magnet; and
    armature having m(2n+1) armature windings disposed thereon in a non-superposed manner in equal pitches with respect to said field magnet poles, said windings each being formed such that the angular spacing of those conductor portions thereof that contribute to the generation of torque is equal to the angular width of a field magnet pole.

2. A direct current motor according to claim 1 wherein terminals of said m(2n+1) armature windings are connected to corresponding ones of 2mn(2n+1) commutator segments which are interconnected in common 2mn by 2mn, further including brushes in sliding contact with said commutator segments for supplying current to said armature windings from a positive and a negative terminals of a direct current supply source, said brushes, which contact respectively with ones of said commutator segments, are angularly spaced from each other by 360°/4mn or by an angle between the commutator segments which are interconnected respectively in common with said ones of the commutator segments.

* * * * *

UNITED STATES PATENT AND TRADEMARK OFFICE
CERTIFICATE OF CORRECTION

PATENT NO. : 4,243,902
DATED : Jan. 6, 1981
INVENTOR(S) : Itsuki Ban et al.

It is certified that error appears in the above-identified patent and that said Letters Patent are hereby corrected as shown below:

Col. 2, line 65, before "advantageously" delete "being".

Col. 3, line 18, delete "Referring now to the development of Fig. 2,"

Col. 3, line 54, change "7.3, 7.2, and 7.1" to -- 7-3, 7-2, and 7-1 --.

Col. 3, line 55, change "7.4 and 7.5" to -- 7-4 and 7-5 --.

Col. 4, line 48, change "8-13" to -- 8-37 --.

Col. 6, line 10, before "armature" insert --an--.

Signed and Sealed this

Nineteenth Day of May 1981

[SEAL]

Attest:

RENE D. TEGTMEYER

Attesting Officer

Acting Commissioner of Patents and Trademarks